(12) United States Patent
Haritou et al.

(10) Patent No.: US 8,866,573 B2
(45) Date of Patent: Oct. 21, 2014

(54) MAGNETIC ATTACHMENT DEVICE

(75) Inventors: Christos S. Haritou, Redcar (GB); Alan Fada, Washington (GB); Ian Fada, South Shields (GB)

(73) Assignees: Christos S. Haritou, Cleveland (GB); Alan Fada, Tyne & Wear (GB)

( * ) Notice: Subject to any disclaimer, the term of this patent is extended or adjusted under 35 U.S.C. 154(b) by 0 days.

(21) Appl. No.: 13/638,695

(22) PCT Filed: Mar. 31, 2011

(86) PCT No.: PCT/GB2011/050664
§ 371 (c)(1),
(2), (4) Date: May 3, 2013

(87) PCT Pub. No.: WO2011/121363
PCT Pub. Date: Oct. 6, 2011

(65) Prior Publication Data
US 2013/0222090 A1 Aug. 29, 2013

(30) Foreign Application Priority Data

Mar. 31, 2010 (GB) .................................. 1005477.3
Feb. 8, 2011 (GB) .................................. 1102167.2

(51) Int. Cl.
| H01F 7/20 | (2006.01) |
| B25B 11/00 | (2006.01) |
| F16G 11/00 | (2006.01) |
| H01F 7/02 | (2006.01) |
| H01F 7/04 | (2006.01) |

(52) U.S. Cl.
CPC ................ *H01F 7/0252* (2013.01); *H01F 7/04* (2013.01); *B25B 11/002* (2013.01); *F16G 11/00* (2013.01)

USPC .......................................... 335/285; 294/65.5

(58) Field of Classification Search
USPC .................................. 335/285–288; 294/65.5
See application file for complete search history.

(56) References Cited

U.S. PATENT DOCUMENTS

| 3,014,751 | A | * | 12/1961 | Smith | 294/65.5 |
| 3,319,989 | A | * | 5/1967 | Ross | 294/65.5 |
| 5,388,952 | A | * | 2/1995 | Hofele et al. | 198/375 |
| 7,850,142 | B2 | | 12/2010 | Sladojevic et al. | |
| 8,298,469 | B2 | | 10/2012 | Groendahl et al. | |
| 2002/0112303 | A1 | | 8/2002 | Hanson | |
| 2005/0269827 | A1 | * | 12/2005 | Heard | 294/65.5 |
| 2008/0217825 | A1 | * | 9/2008 | Sladojevic et al. | 269/8 |
| 2010/0007449 | A1 | | 1/2010 | Tait et al. | |

FOREIGN PATENT DOCUMENTS

GB 2339633 A 2/2000

OTHER PUBLICATIONS

International Search Report, Application No. PCT/GB2011/050664 dated Aug. 4, 2011.

* cited by examiner

*Primary Examiner* — Bernard Rojas
(74) *Attorney, Agent, or Firm* — MacMillan, Sobanski & Todd, LLC

(57) ABSTRACT

A magnetic attachment device comprises a pad, the pad including a base, a backing plate mounting a plurality of magnets, and a top plate. The base is connected to the backing plate and the top plate is connected to the backing plate, the top plate being connected to the backing plate by fasteners, and the pad further comprises flexible sealant situated in a void formed between surfaces of the base and/or the magnets and/or the backing plate.

23 Claims, 10 Drawing Sheets

FIGURE 4

SECTION A-A

MAGNETIC ATTACHMENT DEVICE

FIELD OF THE INVENTION

The present invention relates to a device for removably attaching to metallic surfaces, and in particular to a magnetic device for removably attaching to metallic surfaces.

BACKGROUND OF THE INVENTION

Devices using magnets for attaching to metallic surfaces are known. Such devices are used in rope access systems and are of particular use as positioning aids to hold a rope close to a surface. For example, when working on the outside of a ship's hull, if access is to be gained by rope from the deck level, because of the shape of the hull it is often necessary to provide some means to secure the rope or a person on the rope to the hull, otherwise the person on the rope is situated too far from the hull to be able to work on it. Another example of the use of such devices is where a person is using rope access techniques to work on a metallic wall, for example the leg of an oil rig. By using a magnetic positioning aid, the worker can secure himself and/or his ropes to the wall on which he is working, thereby limiting the scope for movement of himself with respect to the wall which might result from movement of the object of which the wall forms a part or gusts of wind. Another reason to use a positioning aid is to allow a worker to exert force more effectively. For example, if a worker is hanging from a long rope any force he exerts on the wall will result in him moving away from the wall, which may be undesirable for a particular task. By using a positioning aid, the worker can secure himself with respect to the wall so that when he exerts a force on the wall that force is reacted through the positioning aid, so the worker does not move with respect to the wall.

For a magnetic attachment device to generate sufficient force to hold the weight of a man in position, a significant magnetic force is required. The problem arising from this is that the attachment device must be capable of being removed from the surface, which therefore requires a force greater than the magnetic force to be exerted on the device. The types of task where positioning aids are required to be used often involve applying surface finishes such as paints or sealants. Hence, there is a need for a positioning aid to be removable from a wall without the surface of such a wall being damaged.

One positioning aid that addresses these problems is described in the applicants' United Kingdom patent 2339633. This positioning aid includes a pad mounting magnets, a handle for a user to grip, holes to accommodate ropes or clips and a cam mechanism which is used to lift the magnets off a surface to which they are attached. In order to protect the surface to which the positioning aid is attached, each cam is provided with a flexible protective element, which in use lies between the surface of the cam and the surface to which the positioning aid is attached. Therefore, when the cam is actuated to lift the magnets instead of the cam engaging with for example the paint work of a ship's hull, the cam engages with the flexible element. In this way the paint is protected from damage.

However, the positioning device described in United Kingdom patent 2339633 does suffer from some disadvantages. For example, the flexible elements are relatively flimsy and may become damaged, either through use or even in storage. If the device is then used without flexible element being in the correct position, or not being present, the surface to which the device is attached is likely to be damaged.

The device described in United Kingdom patent 2339633 uses a number of rare earth magnets attached to an iron plate, which serves to distribute the magnetic field. The plate and magnets are then installed in a box and the box welded. Rare earth magnets are hydroscopic. It is therefore imperative that the magnets are sealed from moisture. This is of particular importance given the likely fields of use of such devices (ships, oil rigs and the like). In the device described in GB2339633 the magnets are sealed against ingress of moisture by filling the box housing the magnets with epoxy resin. This construction poses two problems. First, it is difficult to service the device if one of the magnets becomes defective. If a magnet becomes defective it is necessary to break the weld between the iron back plate and the steel box, break the epoxy resin and second, the whole assembly of plate and magnets must be replaced because the epoxy resin cannot reliably be removed from the magnets without damaging them.

Whilst United Kingdom patent 2339633 describes a positioning aid, the same principle may be used for many different purposes. For example 2339633 identifies that the positioning aid may be used as a plate lifter. Such a device may also be used simply as a means to hang another object from. For example, a mechanic working on a vehicle may wish to hang up a light, or hang up some tools.

It would therefore be desirable to provide an improved magnetic attachment device.

SUMMARY OF THE INVENTION

According to a first aspect of the invention there is provided a magnetic attachment device comprising a pad, the pad including a base, a backing plate mounting a plurality of magnets, and a top plate, wherein the base is connected to the backing plate and the top plate is connected to the backing plate, the top plate being connected to the backing plate, and the pad further comprising flexible sealant situated in a void formed between surfaces of the base and/or the magnets and/or the backing plate.

Advantageously, the top plate is connected to the backing plate is by fastening means, which may include screws, pins, rivets, bolts.

Preferably, the backing plate includes an opening extending into the void.

The magnets may be rare earth magnets.

Advantageously, the sealant is selected from the group comprising: Polyurethane, rubber, silicone compounds or such substance as provide similar properties. The material properties of the sealant advantageously allow the sealant to be removed from the magnets without causing damage thereto, providing the advantage that the backing plate and any magnets attached thereto that are not damaged may be re-used, with only damaged magnets requiring replacement.

Preferably, the device further comprises a gasket situated between the top plate and the base. More preferably, the device includes a gasket seat.

The base may include a planar underside and walls extending therefrom.

The backing plate may be attached to the walls of the base, for example by welding the respective corners thereof.

The top plate may be welded to the walls of the base. In such a scenario the gasket may be omitted as the weld may provide the water tight seal. Whilst not providing all the advantages in terms of ease of serving, the backing plate and/or the magnets may nevertheless be re-usable to the extent that they are not damaged.

Advantageously, at least one of the side walls includes at least one first element protruding therefrom towards an edge of the back plate. The top plate preferably includes at least one second element extending downwardly therefrom and past an edge of the back plate. More preferably, the second element extends towards the first element. Still more preferably, the gasket seat is at least in part formed by the at least one first element. Yet more preferably, the gasket seat is at least in part formed by the first and second elements.

The device may further comprise an elastically deformable protective element attached to the base, which element may extend around the walls of the base.

The protective element may include at least one portion extending past the upper edge of the wall of the base. The at least one portion may form part of the gasket seat.

The device may further include a handle member engaged with the top plate.

The top plate may include a wall element. Advantageously, the handle member engages with the wall element.

Advantageously, the device further includes at least one lifting means, the lifting means being disposed to lift the device from an attachment configuration to a release configuration. The lifting means may be connected to the top plate.

The device may further include locking means to lock the device in one or both of the attachment configuration and the release configuration.

According to a second aspect of the invention there is provided a magnetic attachment device comprising a body and a pair of levers pivotally attached to the body, and actuation means adapted to cause relative movement between the body and the levers, the body and the levers each including a surface for engagement with a substrate, the device having an attachment configuration and a release configuration, and wherein relative movement between the body and the levers moves the device between the attachment and release configurations.

The body may include the pad of the first aspect of the invention.

Advantageously, the levers of the pair are mounted on common axis. The levers of the pair may be mounted on a common shaft that is supported on the body for rotation about its own axis.

Preferably, the actuation means includes a cam associated with each lever, wherein each lever includes a cam engagement surface, and wherein the cams are mounted rotatably on the body, and wherein the cams are connected to the actuation means, and wherein actuation of said actuation means rotates said cams and thereby generates said relative movement between the body and the levers.

Advantageously, the cam engagement surface is situated between the substrate engagement surface of the lever and the pivot attachment of the lever to the body.

Preferably, the cam engagement surface is situated above the substrate engagement surface.

The substrate engagement surface may provided with a compressible element. The compressible element may be rubber, which may be vulcanised, or plastics for example.

The actuation means may include a shaft supported on the body for rotation about its own axis, wherein the said cams are mounted on the shaft. Preferably, each lever includes a slot, and the shaft may pass through the slot. Preferably, the ends of the slot constitute limits to the relative movement between the body and the levers.

Preferably, each cam is mounted on the body by a bush, and the bush may extend through the slot and through a hole in the body. Advantageously, the shaft extends through the bushes, which extend through the slot in the lever and the hole in the body.

The actuation means may include a handle.

Preferably, the actuation means and the levers are configured such that upon actuation of the actuation means the body moves with respect to the levers, the levers remaining stationary.

The magnetic attachment device may further include biasing means, wherein the biasing means are disposed so as to exert a force on the body and the levers and to bias the levers into engagement with the cams.

The body may include a slot and an element connected to the lever may extend through the slot, and the biasing means may engage with the body and with the element.

The biasing means may be a spring, which may be a coil spring, a leaf spring or a torsion spring for example.

The body may include a top plate, the cams and the actuation means, and the top plate may mount the shaft to which the levers are pivotally attached.

The top plate may mount the biasing means.

The slot may be formed in the top plate.

Advantageously, the substrate engagement surface of the body includes a compressible element, which may be rubber, or plastics for example, and may be subjected to a process to change its material properties, for example rubber may be vulcanised.

Preferably, the body includes an element extending laterally past at least the edge of the lever proximate the body. More preferably, the element extending laterally past at least the edge of the lever proximate the body is formed in the compressible element. More preferably, the element extending laterally extends past the edge of the lever distal from the body.

The device may further include locking means to lock the device in one or both of the attachment configuration and the release configuration.

The magnetic attachment device described herein provides a number of advantages. First, due to the structural arrangement of the pad, the device is simple to construct, may be serviced, and is well sealed from ingress of moisture. Typically, to service the pad, the backing plate removed from the base by cutting the small welds at each corner of the pad. The base and backing plate carrying the magnets may then be removed for overhaul. The use of a flexible sealant provides two advantages. First, the sealant is easy to remove from the base and from between the magnets and from the backing plate. Second, the sealant being flexible absorbs at least some of the shock in the event that the device is dropped. Third, the sealant can take up changes in the dimension of the device due to thermal cycling for example without cracking, and can thereby maintain an effective seal.

By sealing the magnets effectively from ingress of moisture the service life of the magnets can be improved. Also, by providing a device that may be easily serviced, it is possible to replace only those rare earth magnets which have faults, whereas prior art devices required all the rare earth magnets to be replaced even if only one had a fault.

The provision of the parts of the device that contact a substrate on which the device is used with compressible elements, such as rubber sheet, or moulded rubber which may be vulcanised, or moulded plastics materials, is advantageous because the substrate is better protected against damage, such as scratching. Also, the noise upon attachment of the device to a substrate is damped.

The actuation means of the device, and in particular the arrangement of cams and levers provide a number of advantages. Whereas in the prior art devices the cam exerts a point load through a protective flexible element, in the device described herein the lever includes a surface engagement element which spreads the force generated by the cam over a surface area significantly greater than the surface area of the contact point of the cam. Hence, there is significantly less possibility of damage to the substrate through the lever than there is with the prior art devices. Further, the arrangement can ensure that the lever remains in contact with the substrate and that it is the base of the body that is lifted from the substrate surface.

Also, by positioning the cams between the pivotal attachment of the levers to the body and the part of the lever that engages with the substrate surface, the body is caused to move by a greater distance than would be the case if the cams were situated directly over the point where a protective element engages with the substrate surface.

BRIEF DESCRIPTION OF THE DRAWINGS

In the drawings, which illustrate preferred embodiments of the invention, and are by way of example.

DETAILED DESCRIPTION OF THE PREFERRED EMBODIMENTS

Figure 1:
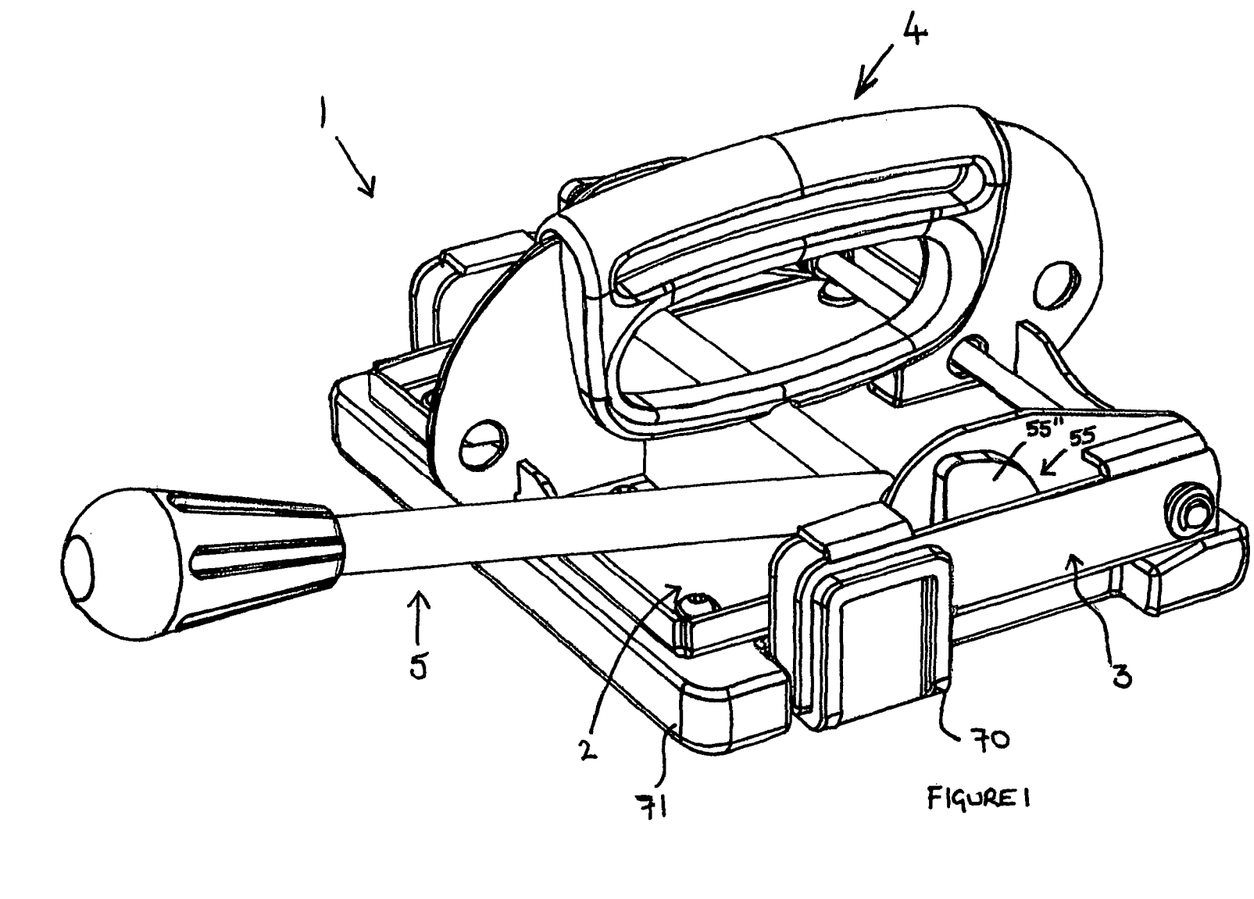
FIG. 1 is a schematic representation of a magnetic attachment device according to a first aspect of the invention.

Referring now to FIG. 1, there is shown a magnetic attachment device 1 comprising a magnetic element 2, release levers 3, a handle 4 and an actuation lever 5.

Figure 2:
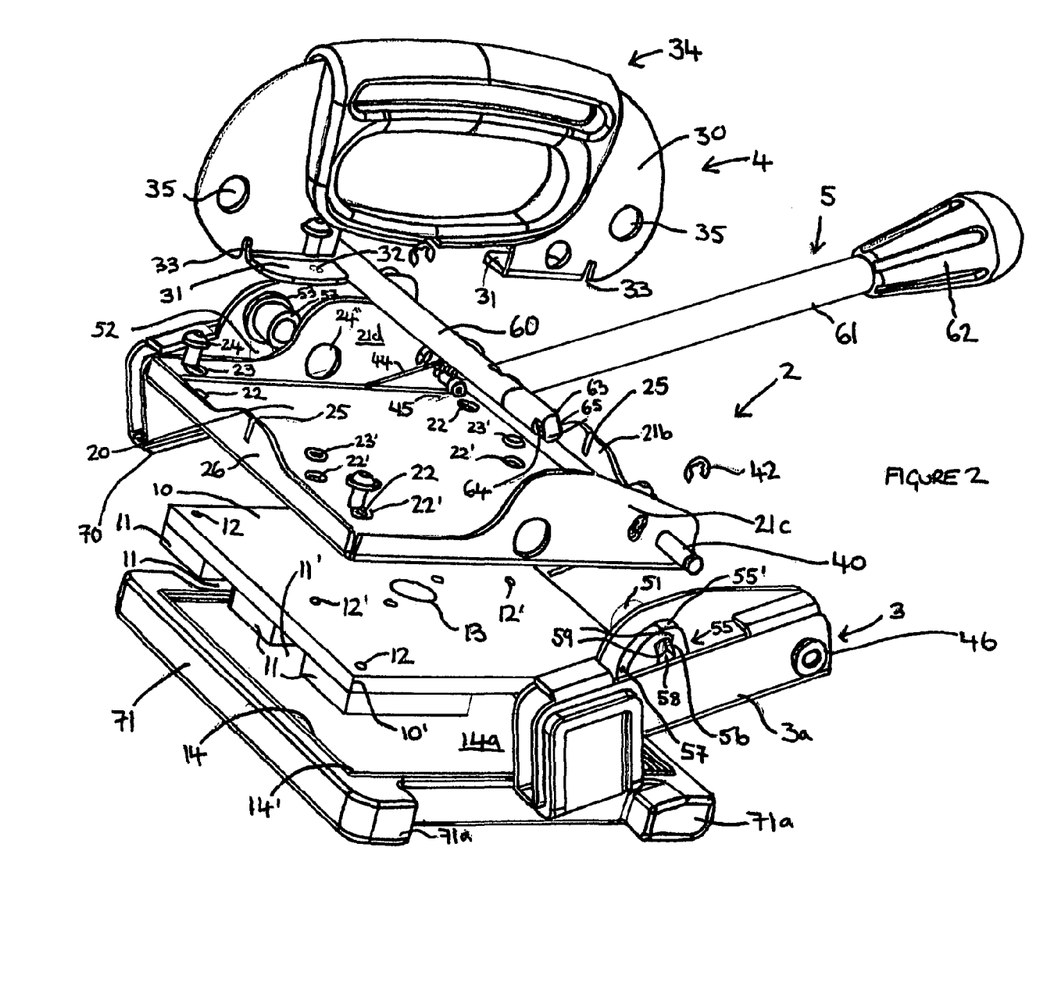
FIG. 2 is an exploded view of the magnetic attachment device illustrated in FIG. 1.

FIG. 2 shows the parts of the device 1 in greater detail. The magnet element 2 comprises a ferrous metal back plate 10 upon which are mounted six rare earth magnets 11. The back plate 10 includes a number of threaded bores 12, 12' the purpose of which is described below. The plate 10 and attached magnets 11 fit into a tray 14 which in the illustrated example is formed of stainless steel. Attachment of the plate 10 to the tray 14 is achieved by welding at the respective corners 10', 14'. With the plate 10 secured to the tray 14, a flexible sealant is introduced into the space between the underside of the plate 10 and the bottom 14a of the tray 14 through the hole 13. The sealant occupies the spaces 11' between adjacent magnets 11. The free surface of the magnets 11 may or may not be in contact with the bottom 14a of the tray 14. Where the free surface of the magnets 11 is not in contact with the bottom 14a of tray 14, the sealant also fills this space so that each magnet 11 is sealed completely against moisture.

The sealant also serves two other useful purposes. First, because the sealant is flexible it dissipates energy in the event of the device being dropped, or repeatedly being brought into contact with a metal surface in and being subjected to shock loads. It should be noted that when the magnets 11 come within a certain proximity of a metal object the magnetic force attracting the device to the object is very strong, which can exert a significant shock load on the device. Second, again because the sealant is a flexible sealant it is possible to remove the sealant from between and around the magnets 11 without damaging them. It has been found that where electrical potting compounds are used, which set hard, attempts to remove the potting compound often results in the magnets 11 being damaged, for example by cracking or the edges thereof breaking away. When this occurs the magnet is no longer of use. Hence, in servicing the positioning aid of the prior art the customary practice is to replace the whole assembly of the back plate and the magnets. Due to the expense of rare earth magnets it is desirable to be able to replace as few as possible. By using a flexible sealant in many cases it is believed that it will be possible to remove the sealant without damaging the magnets 11. Any individually defective magnets can then be replaced, the plate 10 re-attached to the tray 14 and the space between the plate 10, magnets 11 and tray 14 re-filled with flexible sealant.

With the plate 10 attached to the tray 14 and the space therebetween filled with sealant, the top plate 20 may be attached. The plate 20 is provided with upstanding walls around the perimeter thereof, namely front and back walls 21a, 21b and side walls 21c, 21d. The plate is also provided with apertures 22, 22' which are located so as to align with the threaded bores 12, 12' in the back plate 10. As can be seen from FIG. 2, a fastener 24 in the form of a screw in the present example is provided for each hole 22, a seal in the example in the form of an O ring 23 also being provided to ensure a seal between the head of the screw 24 and the surface of the plate 20.

The handle 4 comprises a bracket 30 which includes flange portions 31 each including an aperture 32 sized to receive a fastener 24. The fasteners 24 pass through the respective holes 32 and 22 to attach he bracket 30 to the plate 10. As can be seen from FIG. 2, an O ring 23' is provided between the underside of the flange 32 and the upper surface of plate 20. The bracket 30 also includes slots 33, which are located so as to align with corresponding slots 25 in the plate 20. The arrangement of slots 25 and 33 provide lateral strength to the assembled device as can be understood from FIG. 1. The handle 4 is provided with a grip portion 34, which in the example includes a plastics or rubber moulding, but may equally be formed of other suitable materials. For example, the grip portion could be fabricated from metal, which may be wrapped with a flexible material such as rubber. The bracket 30 also includes apertures 35 which a user may pass a rope or other attachment element through.

The mechanism for lifting the magnetic attachment device from a metal surface is mounted on the top plate 20, and will now be described in greater detail. The lifting mechanism includes levers 3 which are mounted on the top plate 20 by means of shafts 40 and 41. Each lever 3 is mounted on one end of the shaft 40 and is free to rotate, the levers being held in position by clips 42. The position of each lever 3 with respect to the top plate 20 is controlled by a cam 55, which includes a bush 51 that is configured to slide in a slot 52 in the lever 3 and to pass through a corresponding hole 21f in the side wall 21d of the top plate. A collar 53 on the bush 51 secures the bush 51 with respect to the lever 3. The collar 53 may take the form of a circlip, and the bush 51 may be provided with a groove for such a circlip to sit in. A cam 55 is attached to one end of the bush 51. The cam 55 includes two aligned bores 56, 57 extending laterally through the cam. The cam also includes an aperture 58 having two flat sides. The aperture is configured to receive the end 63 of shaft 60, which includes flat sides 65 and has external dimensions substantially similar to the internal dimensions of the aperture 58. The end 63 of shaft 60 also includes a bore 64 which is positioned such that when the said end 63 is located in the aperture 58 the bore 64 is aligned with the bores 56, 57. The cam 55 may then be secured to the shaft 60 by inserting a roll pin 57' or the like through the aligned bores 56, 57 and 64.

Figure 3:
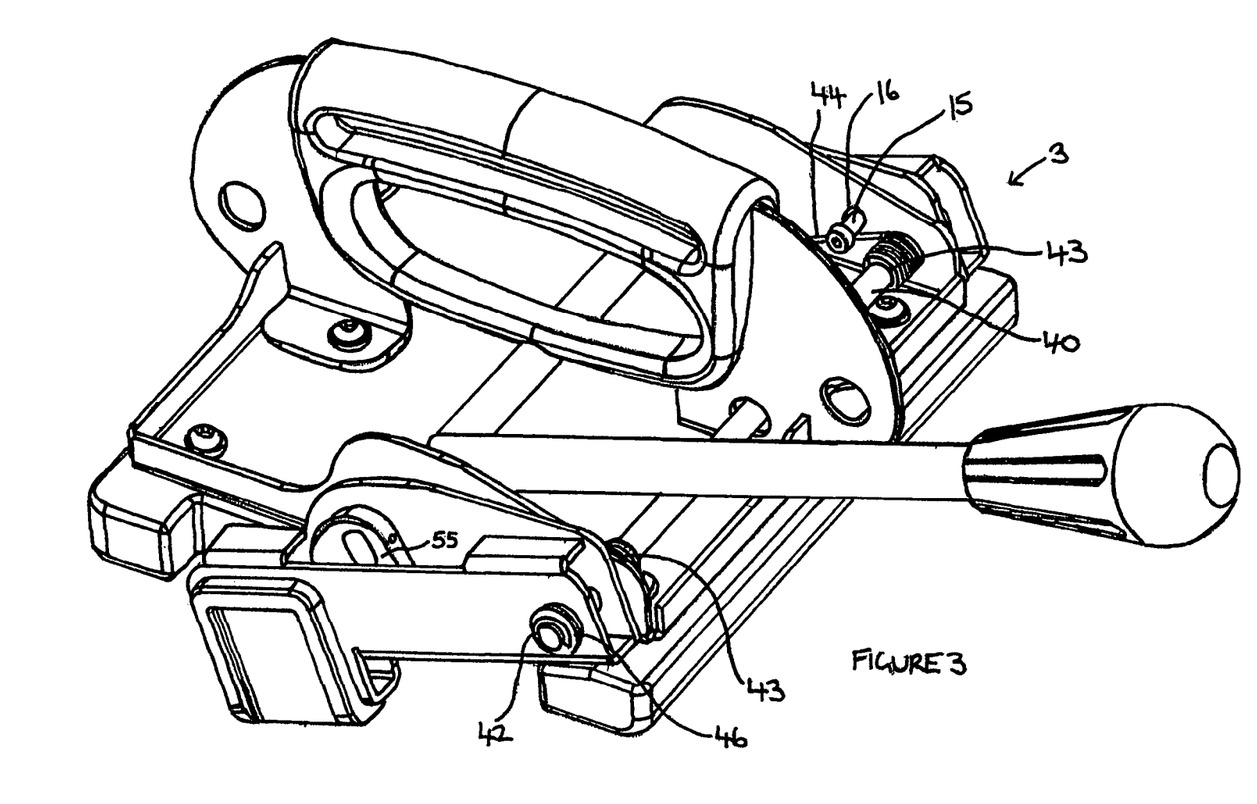
FIG. 3 is schematic representation of the device in the configuration illustrated in FIG. 2, in assembled form.
Figure 4:
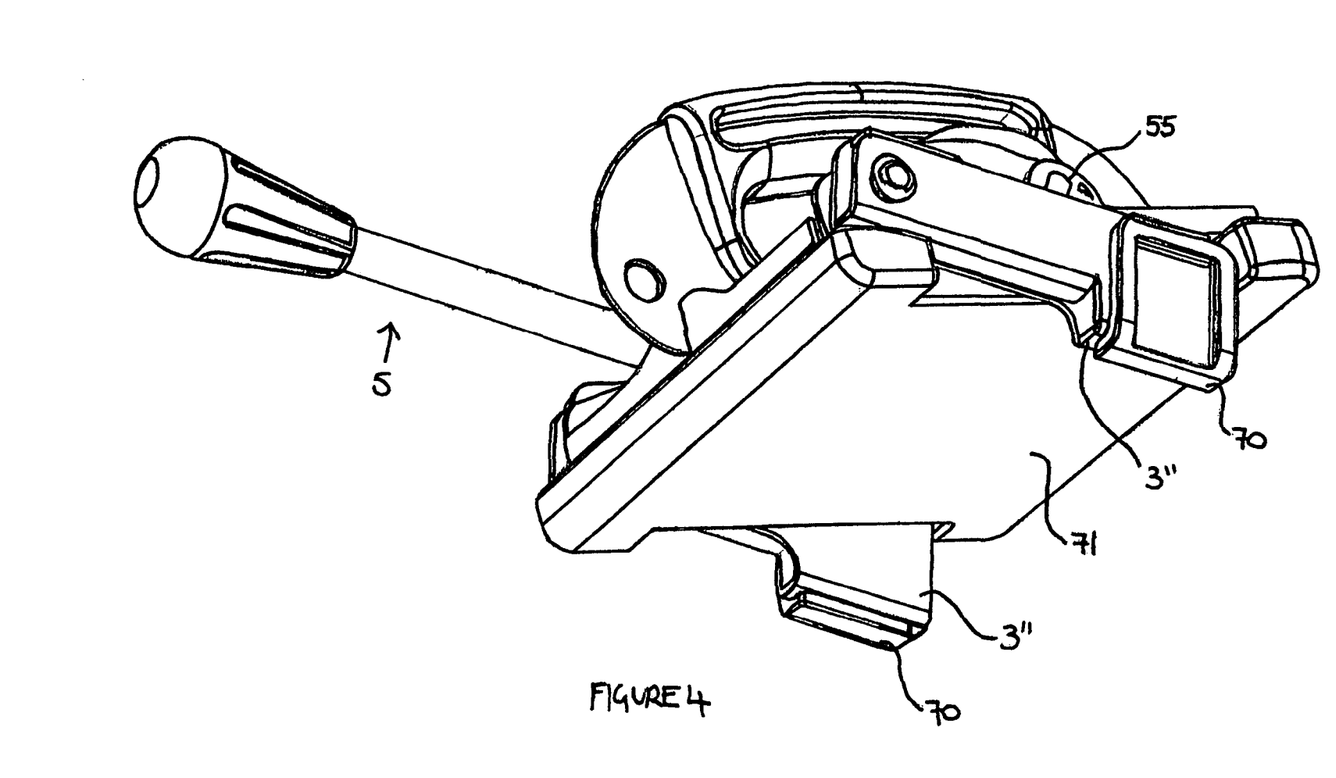
FIG. 4 is a schematic representation of the device shown in FIG. 3 from the underside.

The configuration that the device 1 adopts when attached to a metallic surface is illustrated in FIG. 1. The smaller part of the cam 55' is in engagement with lever 3, and the bush 51 is situated to the bottom of the slot 52. To lift the magnet device from a metallic surface to which it is attached sufficient force to overcome the attraction between the device and the metallic surface must be generated. This is achieved by grasping the grip portion 62 of handle 61 and rotating the lever clockwise. The handle 61 is fixed with respect to the cam 55 and hence rotation of the shaft 60 changes the part of the cam that is in contact with the lever, that part of the cam being part 55" where the cam surface is situated further from the axis of rotation of the cam 55. The position of the levers 3 and handle 61 are illustrated in FIGS. 2 and 3.

In the illustrated arrangement, during rotation of the shaft 60, the levers remain stationary and the rest of the device moves with respect to the levers, the bushes 51 sliding from the bottom of the slot 52 to the top thereof.

When attaching the device 1 to a metallic substrate, such as the wall of a ship, it is desirable that the magnetic force of attraction be taken up gradually. This may be achieved by presenting the device 1 to the substrate with the cams 55 in the "lifting off" position. In such a configuration only one end of the base of the device is brought into contact with the substrate, with the remainder of the base being positioned at an angle with respect to the surface. There is still a significant magnetic force of attraction between the device and the substrate, but that force is reduced because of air gap between most of the device and the substrate. The speed at which the magnetic force of attraction between the device and the substrate is taken up can be controlled by controlling the speed at which the handle 61 and hence shaft 60 and cams 55 are moved from the configuration shown in FIGS. 2 and 3 to the configuration shown in FIG. 1. The magnetic force of attraction between the device 1 and the substrate results in a significant frictional force between the cam 55 and the surface 3' of lever 3, which prevents the shaft 60 from rotating unless a force is exerted on the handle 61. Therefore, when an operator presents the device up to a metal substrate, he then pushes or pulls the handle 61 from the position shown in FIGS. 2 and 3 to the position shown in FIG. 1.

The cams 55 run on surfaces 3' formed in the levers 3. As can be seen from FIGS. 1 to 3, the surface 3' is spaced apart from the underside of foot 3" which in the illustrated embodiment is protected by a rubber boot 70, which may be vulcanised rubber to increase wear resistance. Whereas in the positioning aid of the prior art, the cam acted on one side of a flexible element, the other side of which rested on the surface of the metal substrate, in the illustrated embodiment of the present invention, the cam 55 acts on a surface 3' the other side of which is not in contact with the substrate.

In the illustrated example, the underside (or sole) of the tray 14 is protected by a rubber element 71, which may be formed by a moulding process. The rubber may be vulcanised to increase its hardness and resistance to wear. However, it should be noted that the device may be used without a protective rubber moulding, or an alternative protective material may be applied to the underside of tray 14. For example, rubber sheet material could be attached to the underside of tray 14 by a suitable adhesive.

The moulding 71 includes corner elements 71a which extend outward beyond the outer wall 3a of the lever 3. The corner elements 71a protect the levers 3.

Figure 5:
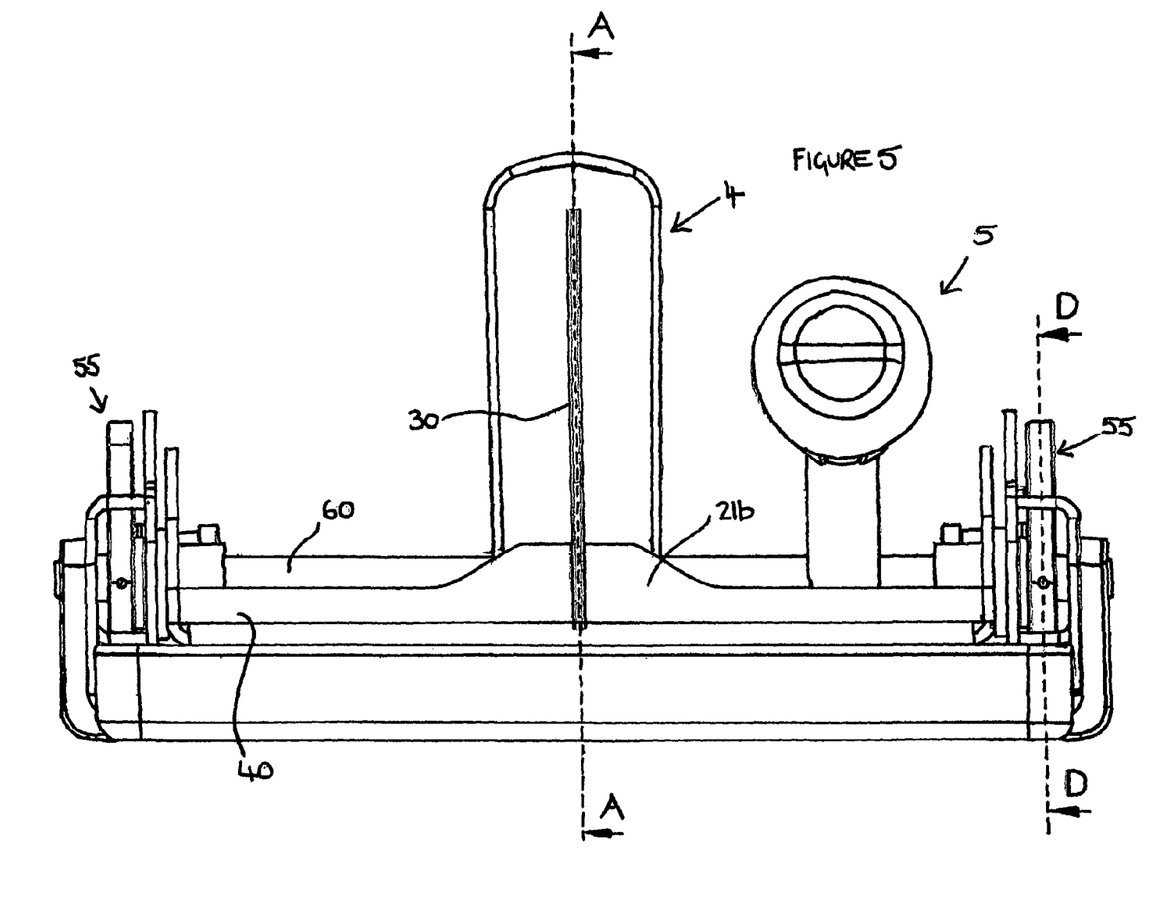
FIG. 5 is an end view of the device illustrated in FIG. 1.
Figure 6:
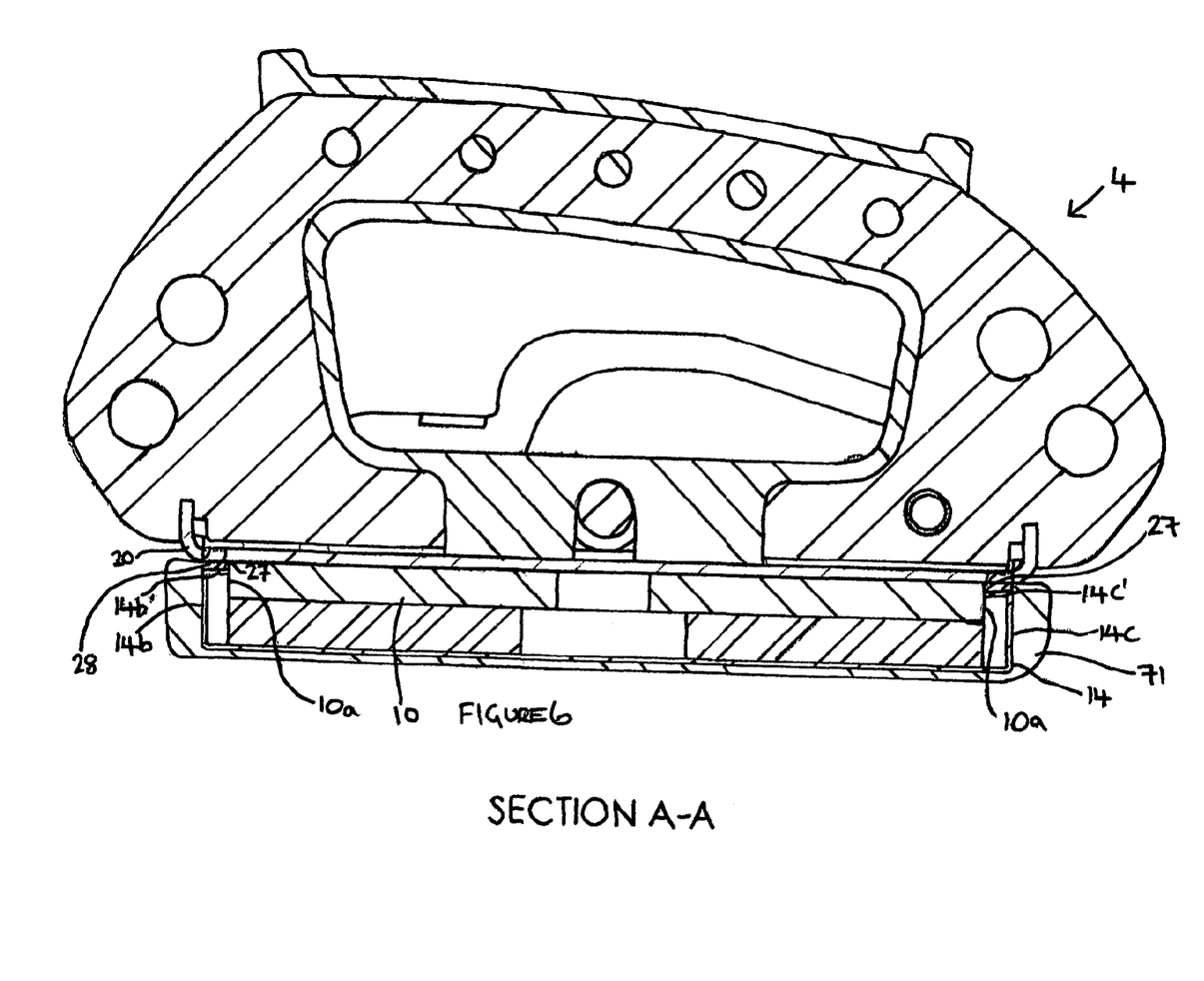
FIG. 6 is a cross-sectional side elevation on the axis A-A of the magnetic attachment device illustrated in FIG. 5.
Figure 7:
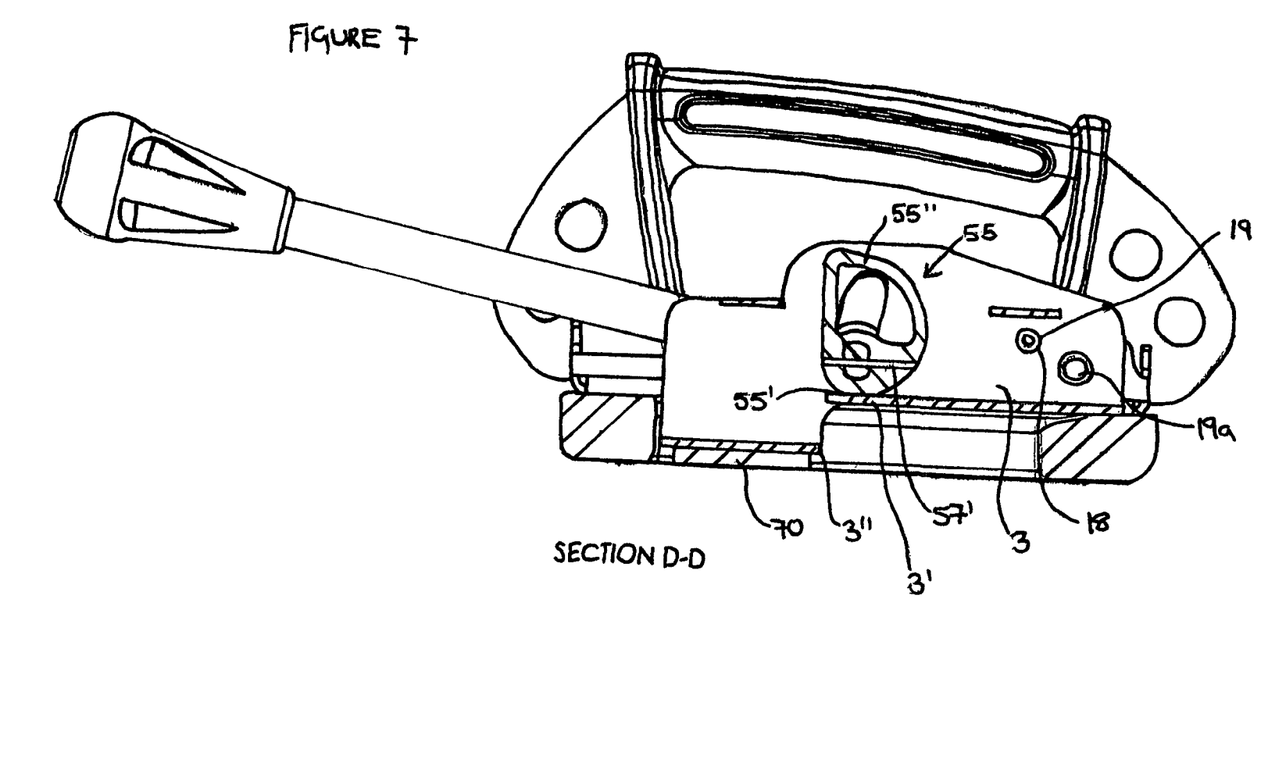
FIG. 7 is a cross-sectional side elevation on the axis D-D of the magnetic attachment device illustrated in FIG. 5.

FIGS. 5 to 7 illustrate certain parts of the device shown in FIGS. 1 to 4 in greater detail. In particular, the tray 14 is shown in greater detail. It can be seen that the side walls 14b, 14c, 14d and 14e include a return, 14b', 14c', 14d' and 14e'. The returns 14b' to 14e' are so shaped and dimensioned that either they abut or are situated in very close proximity to the vertical edges 10a of plate 10. Also, the plate 20 includes portions 27 extending downwardly from the underside of the plate 20 and which engage with the upper surface of the returns 14b' to 14e' respectively. A channel is formed between the outer face of the portions 27, the upper surface of the returns 14b' to 14e' and the inner surface of the overmoulding 71. A gasket 28 is inserted into the so formed channel. In FIG. 6, the gasket is shown in its uncompressed form with the gasket extending through the plate 20. This is in order that the nature of the gasket in the illustrated example may be appreciated. When the top plate 20 is presented up to the back plate 10 the gasket 28 is compressed between the underside of the said plate 20 and the other walls of the channel. The gasket 28 is pressed into the interfaces between the portions 27 and the returns 14b' to 14e', thereby sealing the interfaces against ingress of moisture. It will be appreciated that the gasket may provide an effective seal with the overmoulding 71 omitted. In such an embodiment, the gasket is simply compressed between the underside of plate 20, the outer surface of portions 27 and the returns 14b' to 14e'.

FIG. 7 is a cross-section through the lever 3 and cam 55 and illustrates the cam 55 in engagement with the surface 3' of the lever 3. Referring also to FIG. 3, bolts 15 pass through slots 16 in the walls 21c, 21d and pass through holes 18 in the levers 3. The bolts 15 are secured in place by nuts 19, or alternatively, the bolts 15 could be self tapping, and tap into the hole 18. Referring in particular to FIG. 3, a spring 43 is mounted on the shaft 40. One leg 44 of the spring 43 engages on the underside of bolt 15, with the other leg 45 engaging on the upper surface of the top plate 20. The springs 43 therefore exert a force on the levers 3 which are free to move on shaft 40 so that the surfaces 3' of levers 3 are at all times brought up against the surface of cam 55. FIG. 3 also illustrates the assembly of the shaft 40 in a bush 46 which extends through the aperture 19a in the lever 3, and is secured in place by clip 42.

Figure 8:
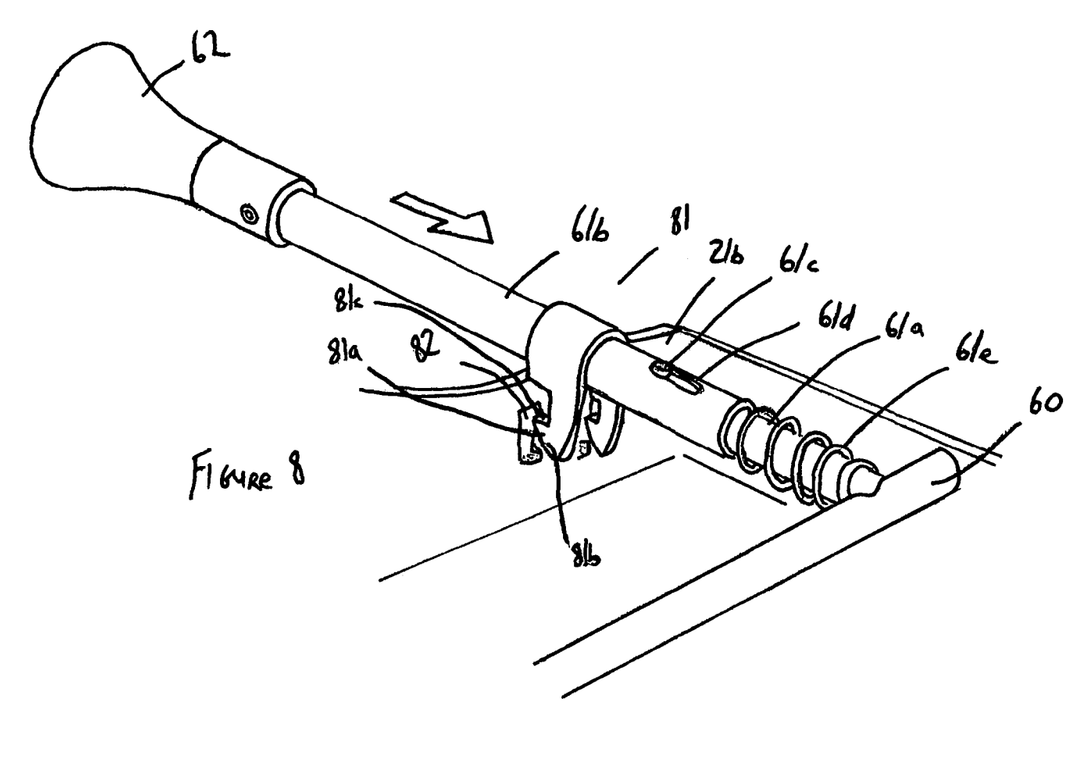
FIG. 8 is a schematic illustration of an alternative embodiment of the invention.
Figures 9, 10:
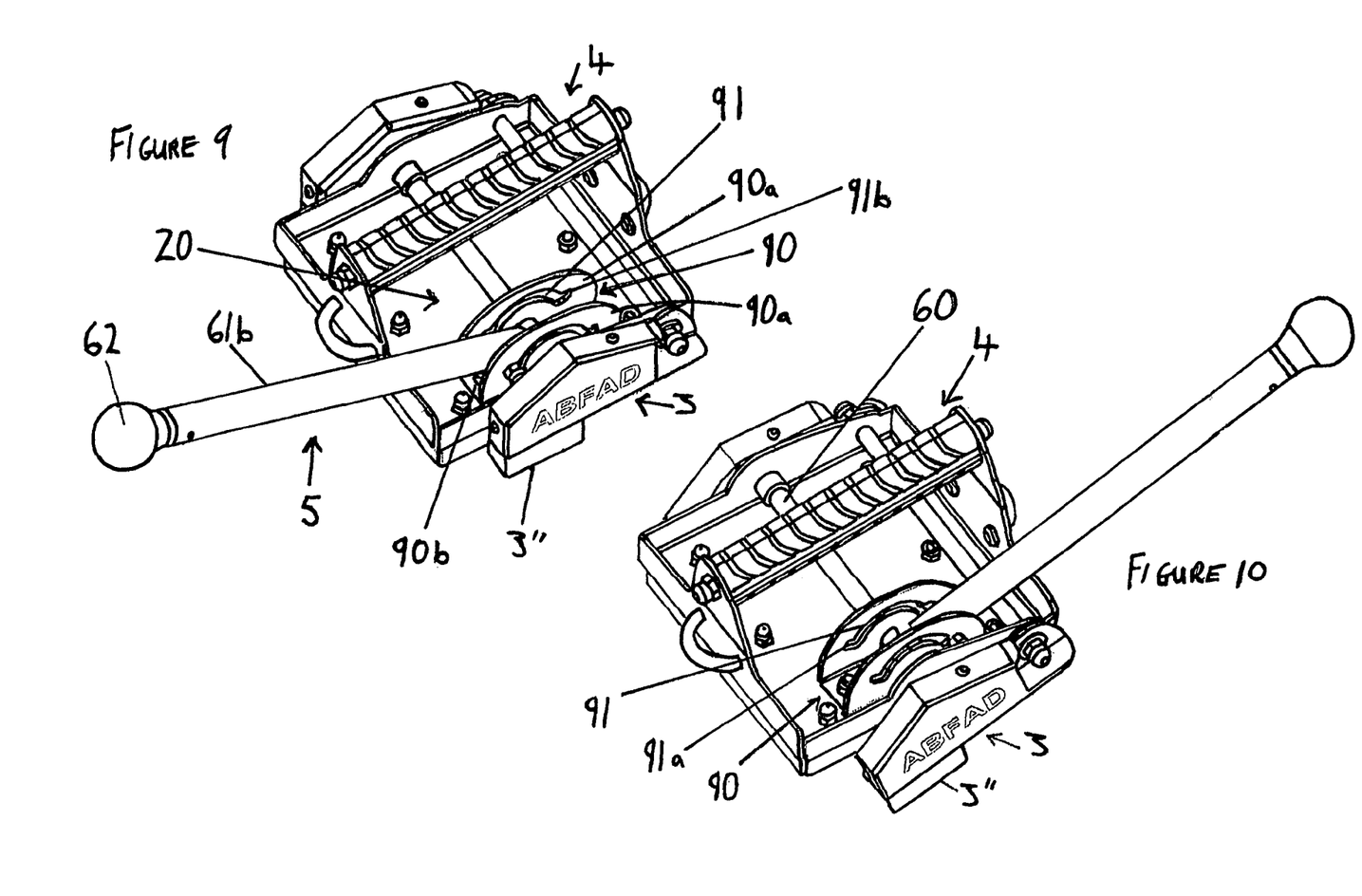
FIG. 9 is a schematic illustration of a further alternative embodiment of the invention showing the device locked in the clamped position.
FIG. 10 is a schematic illustration of the device shown in FIG. 9 locked in the unclamped position.
Figure 11:
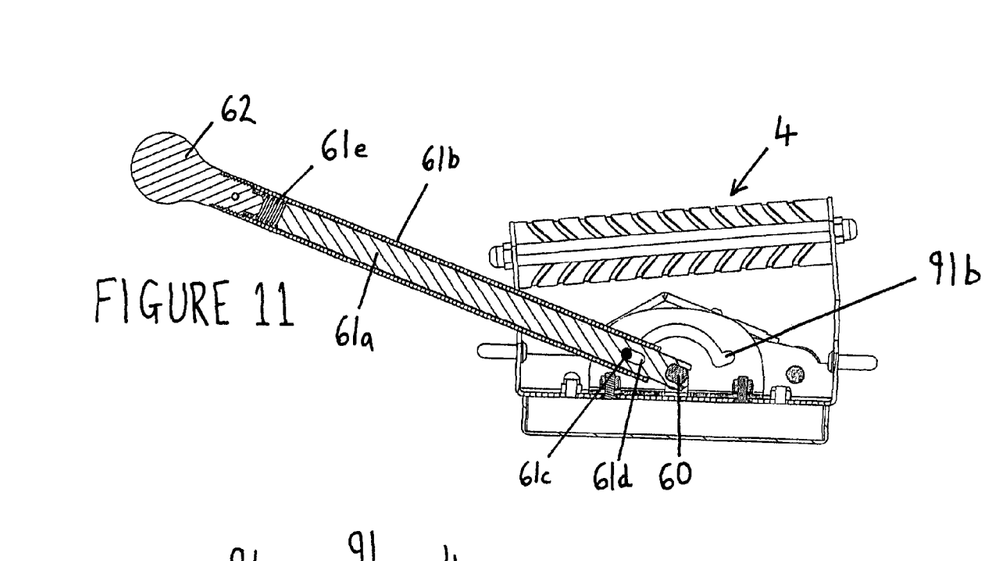
FIG. 11 is a cross-sectional side view of the device as configured and illustrated in FIG. 9.
Figure 12:
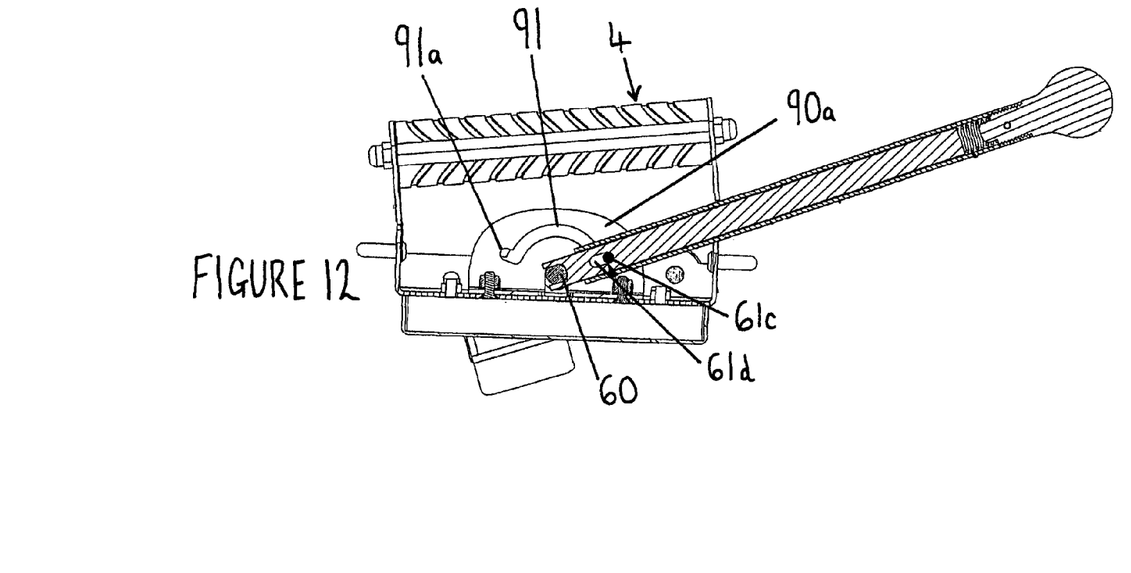
FIG. 12 is a cross-sectional side view of the device as configured and illustrated in FIG. 10.

FIG. 8 illustrates an embodiment including a safety catch for preventing uncontrolled movement of the lever 5 with the levers 3 raised. The lever 5 comprises a first shaft member 61a and a second shaft member 61b arranged to slide on the first shaft member 61a. The first shaft member 61a includes protrusion 61c which slides in a slot 61d. The length of the slot 61d determines the extent to which the second shaft member 61b may slide with respect to the first shaft member 61a. A coil spring 61e is mounted on the first shaft member 61a between the end of the second shaft member 61b and the shaft 60. A locking arrangement 80 comprises a first locking member 81 mounted on the second shaft member 61b and a second locking member 82 comprising an opening in the back wall 21b. The first locking member 81 includes hooks 81a which are is configured to co-operate with the opening of the second locking member 82, to lock the lever 5 such that the levers 3 are in their raised configuration. In order to release the lever 5 from its locked configuration the grip portion 62 is grasped and pushed in the axial direction of the first and second shaft members 61a, 61b. The second shaft member 61b slides with respect to the first shaft member 61a against the restoring force of the spring 61e, until the end of the slot 61d proximate the grip portion 62 engages the protrusion 61c. In this configuration the first locking member 81 is released from and clear of the second locking member 82. In use the operator would hold on to the grip portion 62 and mover the lever 5 through an arc, rotating the shaft 60 about its own axis and thereby raising the levers 3 until the device is in the configuration illustrated in FIGS. 1 and 7. When the user releases the force acting against the spring 61e the second shaft member 61b slides along the first shaft member 61a away from the shaft 60 until the protrusion 61c reaches the end of the slot 61d. As can be seen from FIG. 8 the hooks 81 are provided with curved faces 81b. When the operator wishes to release the device, the lever 5 is moved through an arc. As the curved faces 81b engage the upper ends of back wall 21b, they act to push the second shaft member 61b towards the shaft 60 when a continued downward pressure is exerted on the lever 5. When the face 81b has passed the upper edge 82a of the opening in the back wall 21b, the second shaft member 61b is pushed away from the first shaft member 61a and the first locking member 81 locks with respect to the second locking member 82, the flat surface 81c engaging with the wall 21b.

Referring now to FIGS. 9 to 12, the embodiment illustrated provides for the device to be locked in both the clamped and the unclamped configurations. This is achieved by an arrangement which prevents movement of the handle in one of two locking positions, yet permits movement of the handle in when the arrangement is not in either of the two locking positions.

FIGS. 9 to 12 illustrate an embodiment including a safety catch for preventing uncontrolled movement of the lever 5 with the levers 3 raised or lowered. The lever 5 comprises a first shaft member 61a and a second shaft member 61b arranged to slide on the first shaft member 61a. The first shaft member 61a includes slot 61d. A pin 61c is attached to the second shaft member 61b and extends through the slot. 61d. The pin 61c extends beyond the outer surface of the second shaft member 61b to engage with tracks 91 formed in the walls 90a of a bracket 90. The bracket 90 is formed by walls 90a joined by a base 90b, the bracket 90 being substantially U-shaped in cross-section. The bracket 90 is attached to the top plate 20 of the device. The tracks 91 include end portions 91a, 91b. The slot 61d is of a dimension that allows the pin to move into the end portion 91a or 91b, when the handle is moved so that the pin 61c is aligned with one of the end portions. A coil spring 61e is mounted within the second shaft member 61b between the end of the second shaft member 61a and the base of the grip portion 62 of actuation lever 5.

In order to release the lever 5 from one of its locked configurations the grip portion 62 is grasped and pushed in the axial direction of the first and second shaft members 61a, 61b. The second shaft member 61b slides with respect to the first shaft member 61a against the restoring force of the spring 61e, until the end of the slot 61d distal from the grip portion 62 engages the pin 61c. In this configuration the pin is moved out of the end portion 91a, 91b into the axis of the central section of the track 91. In use, once the pin 61c is in the central section of the track 91 the operator may push or pull the actuation lever 5 to operate the levers 3 without holding the grip portion 62 in any particular position. The action of the pin 61c in the track 91 determines the position of the grip portion 62. To move the device from the clamped configuration shown in FIGS. 9 and 11 to the unclamped configuration shown in FIGS. 10 and 12, the operator pushes the grip portion 62 towards the device and then rotates the lever 5 clockwise. When the operator is prevented from further rotating the lever 5, because the pin 61c has come to abut against the end of the track 91, the first and second shaft members 61a, 61b are forced apart and the pin 61c situates itself in the track end portion 91b. The lever 5 is then locked against rotation and hence the device locked in the unclamped configuration. To move the device to its clamped configuration the same procedure is followed but in reverse.

The locking arrangement follows the same principles as that illustrated in FIG. 8, but allows the device to be locked in both the clamped and unclamped configurations, thereby reducing the risk of inadvertent change in state of the device. The operator must actively let the device down from its unclamped to its clamped configuration, and must actively engage the lever to lift the device from its clamped to its unclamped configuration.

The magnetic attachment device of the invention provides a number of advantages over the prior art. The device is constructed in such a manner that it may be serviced easily. Given the susceptibility of rare earth magnets to decay resulting from moisture ingress and shock loads, this is particularly advantageous, especially when considering the environment in which the devices may well be used, and that many of their applications involve securing people safely to structures. Not only does the construction of the device provide for ease of servicing, but also, the magnets are well sealed against ingress of moisture and they are protected against shock loads. Further, the cam and lever assemblies are robust and ensure that shear forces arising from movement of the handle and hence the cams are transmitted to a substrate to which the device is attached. The provision of compressible protective elements in the form of a rubber overmoulding covering the base of the device, and rubber boots covering the feet of the levers assists not only in preventing the substrate from being damaged, but also assists in dissipating shock loads on the device, and also reduces noise when the device attaches to a metal substrate.

The invention claimed is:

1. A magnetic attachment device comprising:
a body;
a pair of levers pivotally attached to the body; and
actuation means adapted to cause relative movement between the body and the levers, the body and the levers each including a surface for engagement with a substrate, the device having an attachment configuration and a release configuration; wherein
relative movement between the body and the levers moves the device between the attachment and release configurations,
the actuation means includes a cam associated with each lever,
each lever includes a cam engagement surface,
the cams are mounted rotatably on the body,
the cams are connected to the actuation means, and
actuation of said actuation means rotates said cams and thereby generates said relative movement between the body and the levers.

2. A magnetic attachment device according to claim 1, wherein the levers of the pair are mounted on a common shaft that is supported on the body for rotation about its own axis.

3. A magnetic attachment device according to claim 1, wherein the cam engagement surface is situated between the substrate engagement surface of the lever and the pivot attachment of the lever to the body.

4. A magnetic attachment device according to claim 1, wherein the cam engagement surface is situated above the substrate engagement surface.

5. A magnetic attachment device according to claim 1, wherein the substrate engagement surface of each lever is provided with a compressible element.

6. A magnetic attachment device according to claim 1, wherein the actuation means includes a shaft supported on the body for rotation about its own axis, wherein the said cams are mounted on the shaft.

7. A magnetic attachment device according to claim 6, wherein each lever includes a slot, and wherein the shaft passes through the slot, and wherein the ends of the slot constitute limits to the relative movement between the body and the levers.

8. A magnetic attachment device according to claim 6, wherein each lever includes a slot, and wherein the shaft passes through the slot, wherein each cam is mounted on the body by a bush, and wherein the bush extends through the slot and through a hole in the body, wherein the shaft extends through the bushes, which extend through the slot in the lever and the hole in the body.

9. A magnetic attachment device according to claim 1, wherein the actuation means includes a handle.

10. A magnetic attachment device according to claim 1, wherein the actuation means and the levers are configured such that upon actuation of the actuation means the body moves with respect to the levers, the levers remaining stationary.

11. A magnetic attachment device according to claim 1, further including biasing means, wherein the biasing means are disposed so as to exert a force on the body and the levers and to bias the levers into engagement with the cams.

12. A magnetic attachment device according to claim 11, wherein the body includes a slot and an element connected to the levers extends through the slot, and wherein the biasing means engages with the body and with the element.

13. A magnetic attachment device according to claim 1, wherein the substrate engagement surface of the body includes a compressible element.

14. A magnetic attachment device according to claim 1, wherein the body includes two elements each extending laterally past at least the edge of one of the levers proximate the body.

15. A magnetic attachment device according to claim 14, wherein the substrate engagement surface of the body includes a compressible element, wherein the element extending laterally past at least the edge of the lever proximate the body is formed in the compressible element.

16. A magnetic attachment device according to claim 1, wherein the substrate engagement surface of each body is provided with a compressible element.

17. A magnetic attachment device comprising:
a body;
a pair of levers pivotally attached to the body; and
actuation means adapted to cause relative movement between the body and the levers, the body and the levers each including a surface for engagement with a substrate, the device having an attachment configuration and a release configuration; wherein
relative movement between the body and the levers moves the device between the attachment and release configurations, wherein either:
(1) the body includes a top plate and wherein the top plate mounts the shaft to which the levers are pivotally attached, the cams and the actuation means; or
(2) further including locking means adapted to lock the device in at least one of the attachment and release configurations; or
(3) the body includes a pad, the pad including a base, a backing plate mounting a plurality of magnets, and a top plate, wherein the base is connected to the backing plate and the top plate is connected to the backing plate, the top plate being connected to the backing plate, and the pad further comprising flexible sealant situated in a void formed between surfaces of the base and/or the magnets and/or the backing plate.

18. A magnetic attachment device according to claim 17, wherein the body includes a top plate and wherein the top plate mounts the shaft to which the levers are pivotally attached, the cams and the actuation means.

19. A magnetic attachment device according to claim 18, further including biasing means, wherein the biasing means are disposed so as to exert a force on the body and the levers and to bias the levers into engagement with the cams, wherein the top plate mounts the biasing means.

20. A magnetic attachment device according to claim 19, wherein the slot is formed in the top plate.

21. A magnetic attachment device according to claim 17, further comprising locking means adapted to lock the device in at least one of the attachment and release configurations.

22. A magnetic attachment device according to claim 17, wherein the body includes a pad, the pad including a base, a backing plate mounting a plurality of magnets, and a top plate, wherein the base is connected to the backing plate and the top plate is connected to the backing plate, the top plate being connected to the backing plate, and the pad further comprising flexible sealant situated in a void formed between surfaces of the base and/or the magnets and/or the backing plate.

23. A magnetic attachment device according to claim 22, wherein the pair of levers is attached to the top plate.

* * * * *